United States Patent
Shiotsuki et al.

(10) Patent No.: US 8,804,528 B2
(45) Date of Patent: Aug. 12, 2014

(54) METHOD OF SELECTING WIRELESS COMMUNICATION PATH

(75) Inventors: Akihiko Shiotsuki, Osaka (JP); Nobuhiko Arashin, Osaka (JP); Osamu Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 289 days.

(21) Appl. No.: 13/265,892

(22) PCT Filed: Apr. 23, 2010

(86) PCT No.: PCT/JP2010/002940
§ 371 (c)(1),
(2), (4) Date: Oct. 24, 2011

(87) PCT Pub. No.: WO2010/125779
PCT Pub. Date: Nov. 4, 2010

(65) Prior Publication Data
US 2012/0057489 A1    Mar. 8, 2012

(30) Foreign Application Priority Data
Apr. 27, 2009 (JP) ................................ 2009-107532

(51) Int. Cl.
G01R 31/08 (2006.01)
H04L 12/28 (2006.01)

(52) U.S. Cl.
USPC ....................... 370/236; 370/315; 370/395.21

(58) Field of Classification Search
None
See application file for complete search history.

(56) References Cited

U.S. PATENT DOCUMENTS

| | | | |
|---|---|---|---|
| 5,468,939 A | 11/1995 | MacLean, IV | |
| 5,949,776 A | 9/1999 | Mahany et al. | |
| 2002/0151325 A1 | 10/2002 | Fitton et al. | |
| 2004/0127214 A1 | 7/2004 | Reddy et al. | |
| 2004/0147254 A1 | 7/2004 | Reddy et al. | |
| 2005/0232454 A1 | 10/2005 | Niederdrank et al. | |
| 2006/0148516 A1 | 7/2006 | Reddy et al. | |
| 2007/0104138 A1 | 5/2007 | Rudolf et al. | |
| 2007/0155338 A1* | 7/2007 | Hong et al. | 455/69 |
| 2007/0195715 A1* | 8/2007 | Yamano et al. | 370/254 |
| 2008/0075038 A1 | 3/2008 | Jin et al. | |
| 2009/0075586 A1* | 3/2009 | Li et al. | 455/7 |
| 2009/0141667 A1* | 6/2009 | Jin et al. | 370/315 |
| 2009/0185492 A1* | 7/2009 | Senarath et al. | 370/238 |
| 2010/0257265 A1 | 10/2010 | Hamada | |

FOREIGN PATENT DOCUMENTS

| | | |
|---|---|---|
| JP | 9-20374 | 1/1997 |
| JP | 10-224845 | 8/1998 |
| JP | 2004-008931 | 1/2004 |
| JP | 2004-139579 | 5/2004 |

(Continued)

OTHER PUBLICATIONS

International Search Report issued Jun. 15, 2010 in International (PCT) Application No. PCT/JP2010/002940.

*Primary Examiner* — Christine Duong
(74) *Attorney, Agent, or Firm* — Wenderoth, Lind & Ponack, L.L.P.

(57) ABSTRACT

Disclosed is a method of selecting a communication path having wider communication bands with respect to wireless communication apparatuses capable of performing direct communication between the wireless communication apparatuses without routing through a relay apparatus. A first wireless communication apparatus determines the capability of the relay apparatus to determine a threshold and compares the received signal strength indicator of a packet transmitted from a second wireless communication apparatus to the first wireless communication apparatus by direct communication with the threshold to determine a communication path for a packet to be transmitted to the second wireless communication apparatus.

6 Claims, 5 Drawing Sheets

(56) References Cited

FOREIGN PATENT DOCUMENTS

| | | |
|---|---|---|
| JP | 2005-151062 | 6/2005 |
| JP | 2005-204123 | 7/2005 |
| JP | 2005-295554 | 10/2005 |
| JP | 2005-323150 | 11/2005 |
| JP | 2006-501777 | 1/2006 |
| JP | 2006-332862 | 12/2006 |
| JP | 2007-096862 | 4/2007 |
| JP | 2007-104600 | 4/2007 |

* cited by examiner

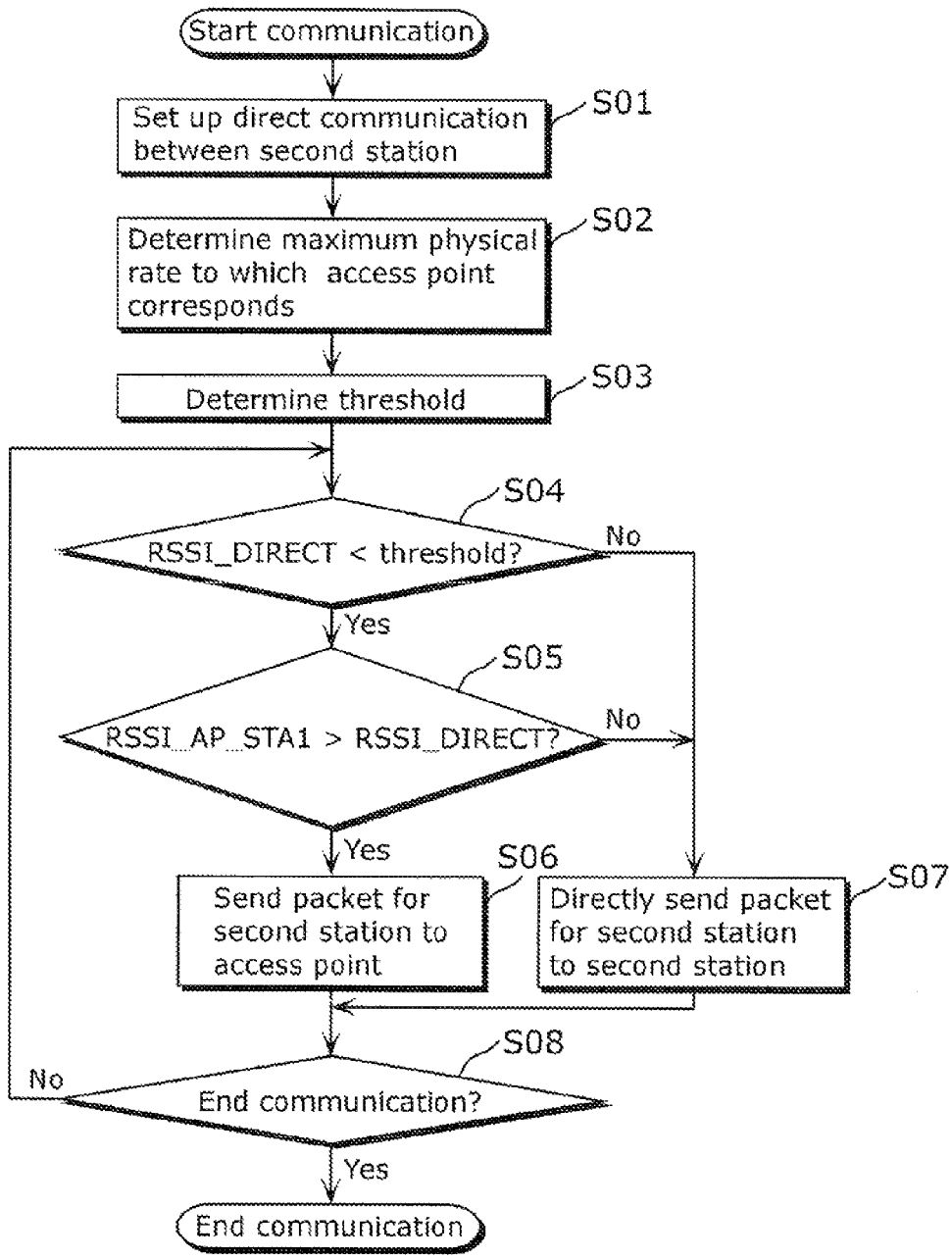

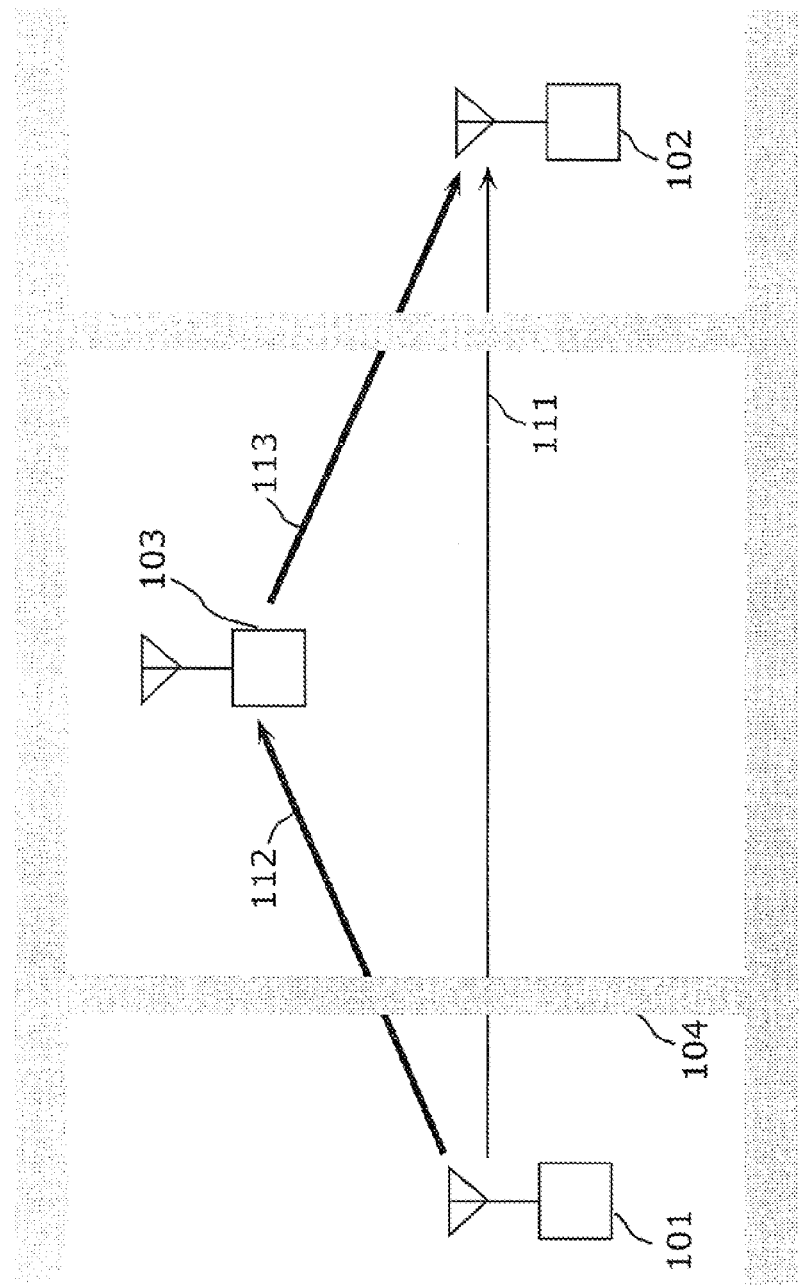

METHOD OF SELECTING WIRELESS COMMUNICATION PATH

TECHNICAL FIELD

The present invention relates to a method of selecting a communication path for communication between wireless communication apparatuses, and particularly to a method of determining whether or not the wireless communication apparatuses should communicate directly.

BACKGROUND ART

Of various types of networks in which information terminals are connected to one another, wireless communication has advantages over wired communication. Advantages thereof include excellent terminal portability and placement flexibility, and a lightweight body achievable due to elimination of wires. Thus, the wireless communication apparatuses are now used not only for data transmission used with personal computers (Hereinafter referred to as PC), but also for various purposes such as video or audio transmission used with home electrical appliances and online competitive games used with game machines.

An example of the wireless communication, which is commonly used, is a wireless Local Area Network (LAN) system. In general, a topology called an infrastructure mode is used in the wireless LAN system. In the infrastructure mode, a station which is a client machine is connected to an access point which is a host machine. For example, in the case where there are a server PC and a digital TV which are wirelessly connected to an access point and when content stored in the server PC is to be viewed by the digital TV placed in a different room, the server PC once transmits the content data for the digital TV to the access point, and the access point transmits the received data to the digital TV. As described above, in the infrastructure mode, data is transmitted between apparatuses via the access point and thus communication bands cannot be used efficiently, which poses a problem of degradation in communication performance.

To address this problem, there is a technique which performs direct communication between two stations under the same access point so that the communication bands can be used efficiently, thereby allowing an accelerated transmission. FIG. 5 shows a concept of a placement of the access point and stations, and packet transmission. In the direct communication technique disclosed in PTL 1, first, a first station 101 and a second station 102, which are the stations transmit data, exchange a control packet through transmission paths 112 and 113 via an access point 103. When the exchange of the control packet is finished, the first station 101 is capable of directly sending a data packet to the second station 102 through a transmission path 111. This allows the efficient use of communication bands, thereby allowing the accelerated and stabilized communication.

CITATION LIST

Patent Literature

Japanese Unexamined Patent Application Publication No. 2007-104600

SUMMARY OF INVENTION

Technical Problem

The direct communication technique is effective in the efficient use of communication bands and the acceleration of communication. However, depending on the placement of the terminals, there is a case that communication via the access point 103 offers wider communication bands and more stable transmission than direct communication. For example, as shown in FIG. 6, when plural walls 104 are on the transmission path 111 for direct communication, a packet communication through the transmission path 111 cannot obtain a sufficient signal strength, and thus communication via the access point 103 is more preferable. On contrast, there is a case that wider communication bands and a higher effective rate can be obtained by direct communication despite a weak signal strength by direct communication, depending on the capability of the access point 103 which relays the packet. For this reason, a function is required which determines whether to perform direct communication or communication via the access point.

Solution To Problem

To provide a solution to the above problem, the method of selecting a wireless communication path according to an aspect of the present invention is characterized by determining the capability of the access point to determine a threshold and comparing the threshold with a received signal strength indicator of a packet received by direct communication to determine communication path for the packet to be sent to a station which is a communication partner.

The capability of the access point is determined based on information included in a control packet.

In addition, the method of selecting a wireless communication path according to an aspect of the present invention is characterized by comparing the received signal strength indicator of a packet received by direct communication with the received signal strength indicator of a packet received from the access point to determine a communication path for a packet to be sent to the station which is a communication partner.

Advantageous Effects of Invention

The present invention makes it possible to accurately determine merits and demerits on performance of direct communication and that of communication via an access point, thereby allowing a fast and stable packet transmission between stations. In addition, the present invention is easy to implement because no change is required to a protocol or a control packet of the existing wireless LAN system.

BRIEF DESCRIPTION OF DRAWINGS

FIG. 2 is a process flow chart according to the embodiment of the present invention.

FIG. 3 is a table for use in determining a threshold for determining whether or not direct communication is available according to the embodiment of the present invention.

FIG. 6 is a conceptual diagram of a placement of the access point and the stations, and packet transmission, in the environment that there are walls.

DESCRIPTION OF EMBODIMENTS

With reference to FIG. 1 to FIG. 5, a method of selecting a wireless communication path according to an embodiment of the present invention is described.

Figure 1:
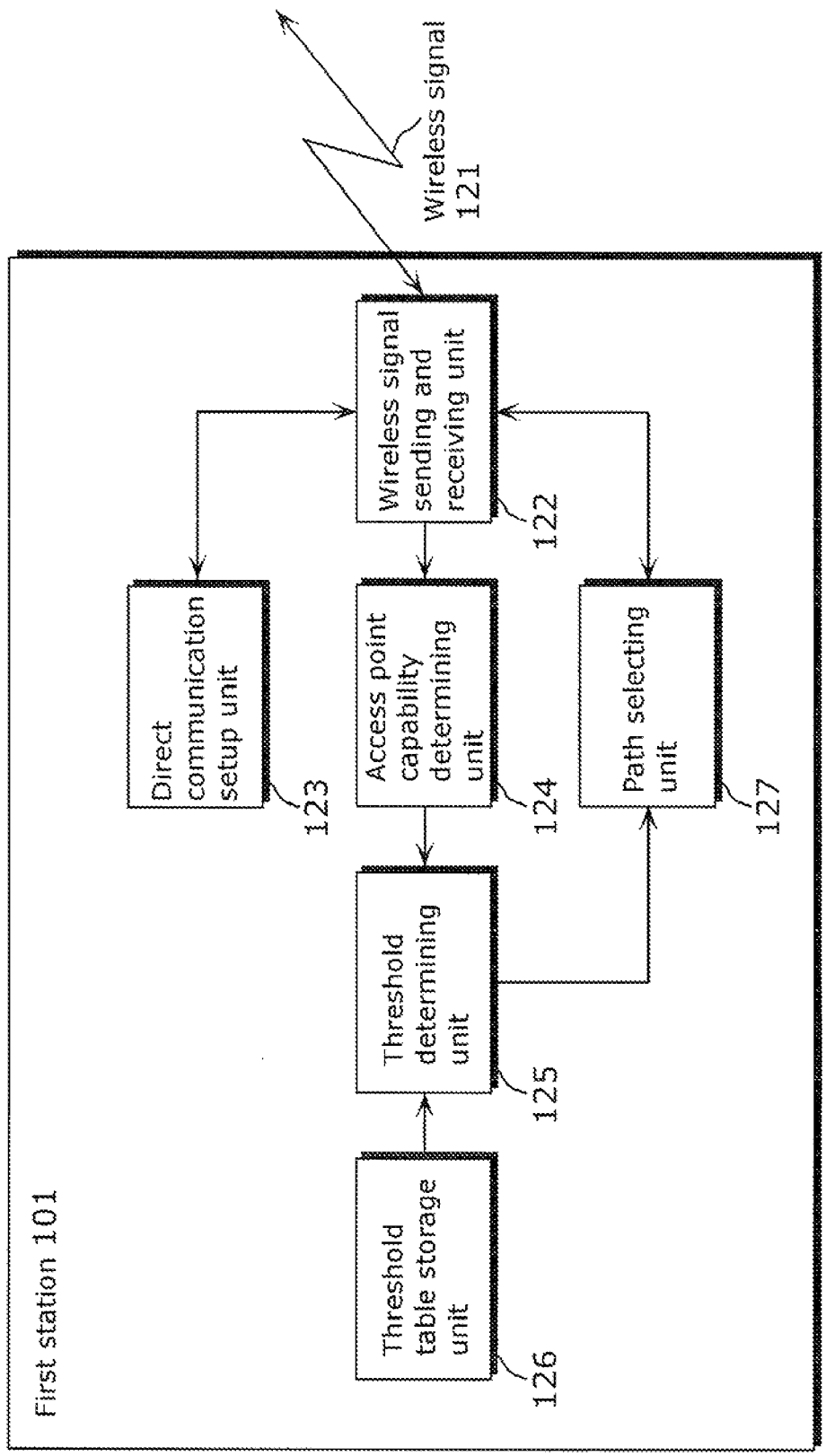
FIG. 1 is a block diagram showing a configuration example of a wireless communication apparatus according to an embodiment of the present invention.
Figure 4:
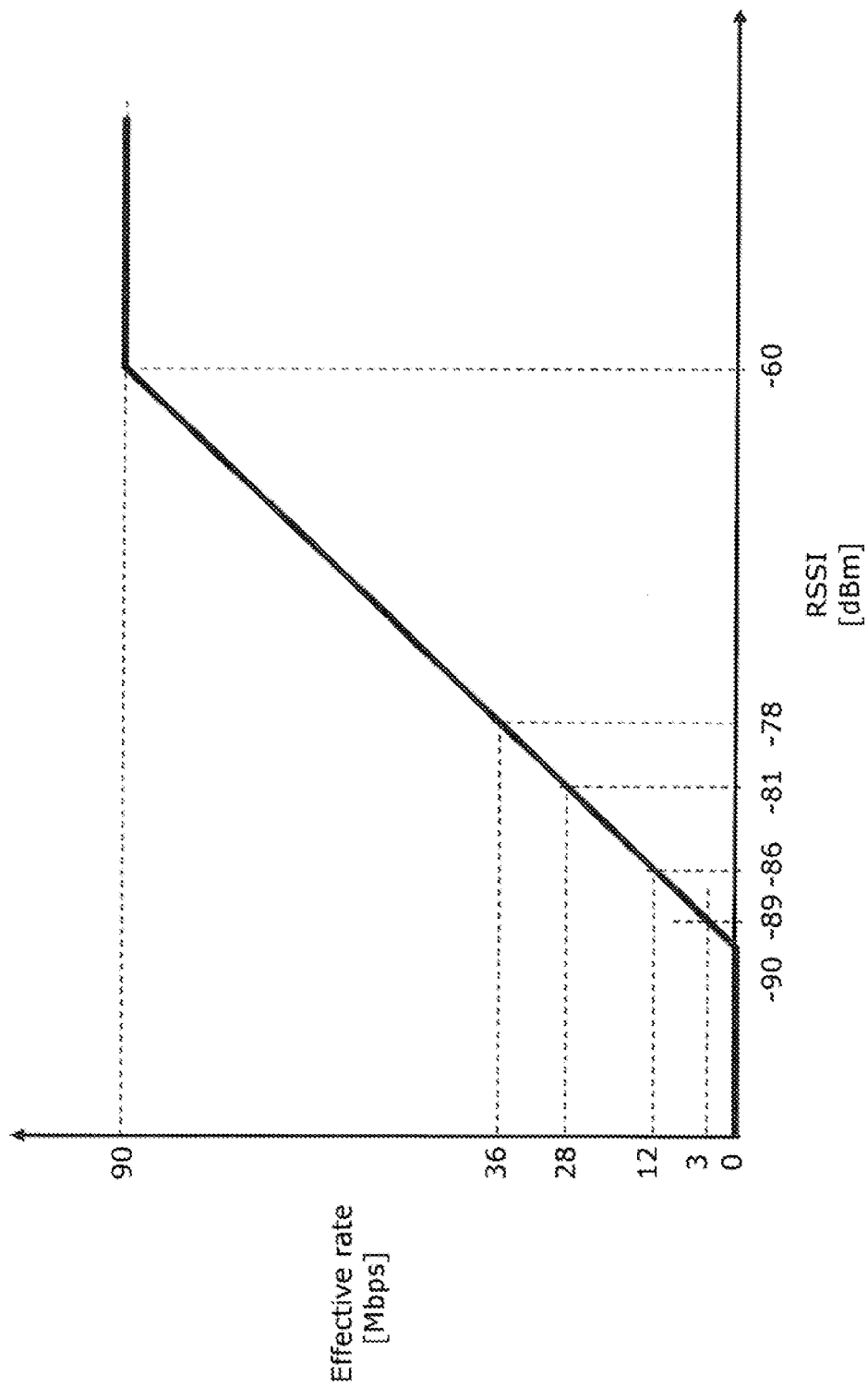
FIG. 4 is a graph showing a relationship between an RSSI and an effective rate when direct communication is performed between a first station and a second station according to the embodiment of the present invention.

FIG. 1 is a block diagram showing a configuration example of the wireless communication apparatus according to this embodiment, FIG. 2 is a flow chart showing a process of the method of selecting a wireless communication path, FIG. 3 is a table for use in determining a threshold, and FIG. 4 is a graph showing a relationship between the RSSI and the effective rate when direct communication is performed between the first station and the second station.

Figure 5:
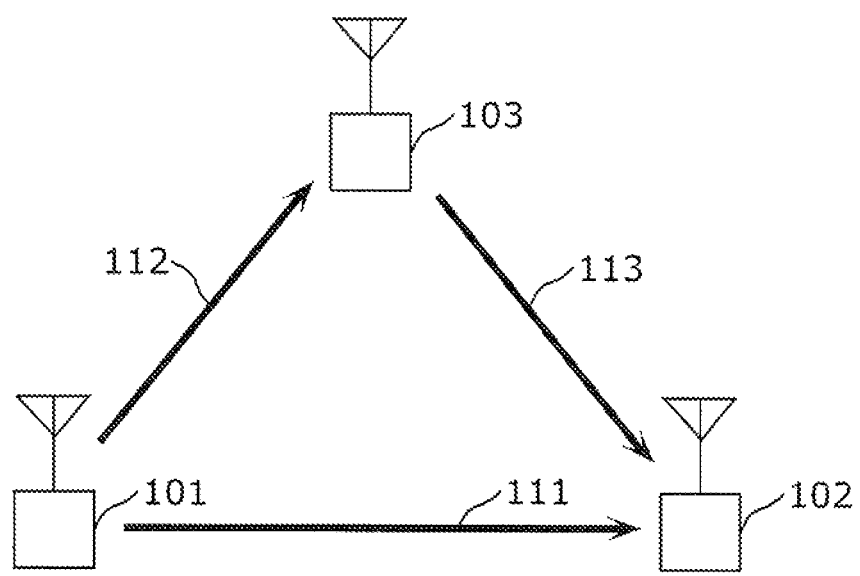
FIG. 5 is a conceptual diagram of a placement of an access point and the stations, and packet transmission.

The wireless communication system according to the embodiment includes, in the same manner as in FIG. 5, a first station 101, a second station 102, and an access point 103. In the embodiment, a process of selecting a communication path at the first station 101 when the first station 101 transmits a data packet to the second station 102 in FIG. 5.

First, the configuration of the first station 101, which corresponds to a wireless communication apparatus according to the present invention, is described with reference to FIG. 1. Here, the configuration of the second station 102 is the same as that of the first station 101, and the description shall be omitted.

In FIG. 1, a wireless signal sending and receiving unit 122 sends and receives a wireless signal 121. A direct communication setup unit 123 sets up direct communication with a wireless communication apparatus which is a communication partner. An access point capability determining unit 124 determines the capability of the access point. A threshold determining unit 125 determines a threshold based on information input from the access point capability determining unit 124 with reference to a threshold table storage unit 126. The threshold table storage unit 126 stores plural thresholds beforehand. A path selecting unit 127 selects a wireless communication path based on information input from the threshold determining unit 125 and the wireless signal sending and receiving unit 122, and notifies the wireless communication path to the wireless signal sending and receiving unit 122.

Direct communication setup unit 123 (i) determines whether or not the second station 102, which is the destination of the data packet, corresponds to direct communication between stations, and when the correspondence to direct communication is confirmed, (ii) exchanges a packet for setting up direct communication with the second station 102 via the wireless signal sending and receiving unit 122 (S01). It is to be noted that how to determine the correspondence to direct communication is not limited, since it is not the nature of the present invention. For example, it is determined that the second station 102 is capable of direct communication when the first station 101 notifies a query on whether or not direct communication is available to the second station 102 and a response is received from the second station 102. This packet exchange may be performed via the access point 103 or directly between the stations. Furthermore, the information on setup to be exchanged is not limited in this embodiment. When this process is finished, a secure direct communication is available, for example, between the first station 101 and the second station 102.

Next, the access point capability determining unit 124 determines the maximum physical rate to which the access point 103 corresponds, as the capability of the access point 103 which relays the packet to the second station 102 (S02). In a wireless LAN complying with IEEE 802.11 family which is standardized by the Institute of Electrical and Electronics Engineers, Inc. (Hereinafter referred to as IEEE), the access point 103 constantly exchanges control packets such as beacon, probe, association and reassociation, with the first station 101 and the second station 102 which are the terminals under the access point 103. Inside these packets are information related to the maximum physical rate such as a physical rate, bandwidths and guard interval length to which the terminal which has sent the control packet corresponds. It is sufficient for the access point capability determining unit 124 to refer to the information when determining the maximum physical rate to which the access point 103 corresponds.

Then, the threshold determining unit 125 determines a threshold in a parameter for determining whether transmitting the data packet to the second station 102 by a direct communication or via the access point 103 (S03). In this embodiment, the parameter for use in determination is a Received Signal Strength Indicator (Hereinafter referred to as RSSI) of the packet when direct communication is performed between the first station 101 and the second station 102. The threshold determining unit 125 determines a threshold by collating (i) the table 126T shown in FIG. 3, which is stored in the threshold table storage unit 126 and used for determining a threshold for determining whether or not direct communication is available, and (ii) the maximum physical rate to which the access point 103 corresponds and which is determined by the access point capability determining unit 124 in S02. For example, when the maximum physical rate to which the access point 103 corresponds is 300 Mbps, the threshold is set to −78 dBm.

The table 126T for use in determining thresholds is created in the following manner. FIG. 4 is a graph showing a relationship between the RSSI of the packet and the effective rate; that is, the band of the transmission path 111 when direct communication is performed by the first station 101 and the second station 102. It is assumed here that the maximum physical rate of both of the first station 101 and the second station 102 are 300 Mbps. Furthermore, in FIG. 4, the effective rate does not increase even when RSSI is greater than −60 dBm. This phenomenon is mainly caused by the performance of the central processing unit (Hereinafter referred to as CPU) of the first station 101 and the second station 102, and is seen in many wireless communication systems. Here, when the maximum physical rate of the access point 103 is also 300 Mbps, it can be said that the effective rate of the transmission paths 112 and 113 is 90 Mbps at most, as is the case with the transmission path 111. However, in a wireless LAN system, it is impossible for the transmission paths 112 and 113 to transmit concurrently due to the carrier sense function. Therefore, when the first station 101 and the second station 102 communicate through the transmission paths 112 and 113 via the access point 103, the effective rate during communication decreases by half. Taking overhead such as transmission waiting time being further added to this into consideration, the maximum effective rate of communication between the first station 101 and the second station 102 via the access point 103 is 36 Mbps which is approximately 80% of half of 90 Mbps. More specifically, as long as the effective rate of direct communication exceeds 36 Mbps, the effective rate of direct communication is always greater than communication via the access point 103. Therefore, according to FIG. 4, the threshold is set to the RSSI of −78 dBm which offers the effective rate of 36 Mbps of by direct communication. Furthermore, a case that the maximum physical rate to which the access point 103 corresponds is 150 Mbps shall be considered. When the physical rate to which the access point 103 corresponds is 150 Mbps and the first station 101 and the second station 102 under the access point 103 communicate with the access point 103, the physical rates of the stations are limited to the maximum of 150 Mbps, even though the maximum physical rates to which the stations correspond are 300 Mbps. The effective rate of packet transmission under the physical rate of 150 Mbps is approximately 70 Mbps. More specifically, since the effective rates of the transmission paths 112 and 113 are 70 Mbps, based on the same idea described above, the maximum effective rate for communication between the first station 101 and the second station 102 via the access point 103 is 28 Mbps which is approximately 80% of half of 70 Mbps. In this case, according to FIG. 4, the threshold is set to the RSSI of −81 dBm which offers the effective rate of 28 Mbps by direct communication. In addition, assuming cases where the maximum physical rate to which the access point 103 corresponds is (i) 11 Mbps and the effective rate per transmission path is 6 Mbps and (ii) 54 Mbps and the effective rate per transmission path is 30 Mbps, the thresholds for each of the cases can be set to −89 dBm and −86 dBm, in the same manner as the above. These thresholds are coordinated and shown in the table 126T in FIG. 3.

After a threshold is determined in S03, the path selecting unit 127 performs the process of selecting a communication path. First, the path selecting unit 127 (i) compares the threshold determined in S03 with the RSSI of the packet to be transmitted through the transmission path 111, that is, by direct communication (Hereinafter refereed to as RSSI_DIRECT) and (ii) determines the status of the transmission path 111 for direct communication (S04). When it is immediately after setting up direct communication and the value of RSSI_DIRECT has not been obtained, the path selecting unit 127 sets the RSSI_DIRECT to the default value of 0 and prepares for the first packet to be transmitted by direct communication. The path selecting unit 127 determines, when the RSSI_DIRECT is equal to or greater than the threshold, that the effective rate of direct communication is greater than that of communication via the access point 103 and determines to directly send the packet for the second station 102 to the second station 102 (S07). While, when the RSSI_DIRECT is smaller than the threshold, the path selecting unit 127 proceeds to the next determining process S05, since there is a possibility that the effective rate of communication via the access point 103 is greater.

The path selecting unit 127 compares the RSSI of the packet to be transmitted through the transmission path 112 (Hereinafter refereed to as RSSI_AP_STA1) with RSSI_DIRECT (S05). As described above, when the packet is transmitted from the first station 101 to the second station 102 via the access point 103, it is impossible to concurrently transmit the packet over the transmission paths 112 and 113. Furthermore, communication via the access point 103 offers better characteristics than direct communication only when the band of the transmission path 112 is greater than that of the transmission path 111. Thus, this condition is determined in S05. The packet for use in detecting RSSI_AP_STA1 is not necessarily be the packet transmitted from the second station 102 via the access point 103 and may be a control packet sent from the access point 103. The path selecting unit 127 determines, when the RSSI_DIRECT is greater than the RSSI_AP_STA1, that the effective rate of direct communication is greater than that of communication via the access point 103 and determines to directly send the packet for the second station 102 to the second station 102 (S07). While, when the RSSI_AP_STA1 is greater than the RSSI_DIRECT, the path selecting unit 127 determines that the effective rate of communication via the access point 103 is greater than that of direct communication and determines to send the packet for the second station 102 to the access point 103 (S06). The path selecting unit 127 notifies the determined communication path to the wireless signal sending and receiving unit 122.

The above process of selecting a path is repeated until the end of communication (S08). The set of the process may be performed for each of the packets or at regular time intervals.

The performance or the thresholds raised in this embodiment is an example and does not limit the scope of the present invention.

As described above, such a configuration allows to easily and accurately select an appropriate communication path from direct communication and communication via the access point, and to transmit data in a fast and stable manner.

[Industrial Applicability]

The method of selecting a wireless communication path according to the present invention can be easily mounted to a device mounted with a wireless LAN system which is capable of direct communication between terminals, and is especially effective for use with storage devices or AV stream compatible devices which requires stable data transmission.

[Reference Signs List]
101 First station
102 Second station
103 Access point
104 Wall
111 Transmission path for the case where the first station transmits a packet to the second station by direct communication
112 Transmission path for the case where the first station transmits a packet to the access point
113 Transmission path for the case where the access point transmits a packet to the second station
121 Wireless signal
122 Wireless signal sending and receiving unit
123 Direct communication setup unit
124 Access point capability determining unit
125 Threshold determining unit
126 Threshold table storage unit
126T Table for use in determining the threshold which is stored in the threshold table storage unit and which is used for determining whether or not direct communication is available
127 Path selecting unit

The invention claimed is:
1. A method of selecting a wireless communication path in a wireless network which includes a first wireless communication apparatus, a second wireless communication apparatus, and a relay apparatus, and which allows a direct communication between the first wireless communication apparatus and the second wireless communication apparatus,
wherein at least a communication scheme between the first wireless communication apparatus and the relay apparatus is identical to a communication scheme between the second wireless communication apparatus and the relay apparatus, said method of selecting the wireless communication path comprising the following performed by the first wireless communication apparatus:
storing predetermined threshold values in correspondence with transmission capability values of the relay apparatus;
determining one of the predetermined threshold values from the stored predetermined threshold values based on a current transmission capability value of the relay apparatus;
comparing the determined predetermined threshold value with a received signal strength indicator of a first packet sent by the direct communication from the second wireless communication apparatus to the first wireless communication apparatus;

determining a communication path for a second packet to be sent to the second wireless communication apparatus by the direct communication or through the relay apparatus; and sending the packet on the determined communication path, wherein the stored predetermined threshold values are set based on (i) a maximum physical rate of transmission of the relay apparatus and (ii) an effective rate of transmission between the first wireless communication apparatus and the second wireless communication apparatus via the relay apparatus.

2. The method of selecting a wireless communication path according to claim 1, wherein the current transmission capability value of the relay apparatus is determined based on information included in a control packet sent from the relay apparatus.

3. The method of selecting a wireless communication path according to claim 1, wherein the first communication apparatus compares a received signal strength indicator of a packet sent from the relay apparatus with the received signal strength indicator of the first packet sent from the second wireless communication apparatus to the first wireless communication apparatus by the direct communication to determine the communication path for the packet to be sent to the second wireless communication apparatus.

4. The method of selecting a wireless communication path according to claim 2, wherein the first communication apparatus compares a received signal strength indicator of a packet sent from the relay apparatus with the received signal strength indicator of the first packet sent from the second wireless communication apparatus to the first wireless communication apparatus by the direct communication to determine the communication path for the packet to be sent to the second wireless communication apparatus.

5. The method of selecting a wireless communication path according to claim 1, wherein each of the predetermined threshold values corresponds to an effective maximum rate of transmission.

6. A first wireless communication apparatus for selecting a wireless communication path in a wireless network which includes the first wireless communication apparatus, a second wireless communication apparatus, and a relay apparatus, and which allows a direct communication between the first wireless communication apparatus and the second wireless communication apparatus, wherein at least a communication scheme between the first wireless communication apparatus and the relay apparatus is identical to a communication scheme between the second wireless communication apparatus and the relay apparatus, wherein the first wireless communication apparatus comprises:

a threshold table storage unit storing predetermined threshold values in correspondence with transmission capability values of the relay apparatus;

a threshold determining unit determining one of the predetermined threshold values from the stored predetermined threshold values based on a current transmission capability value of the relay apparatus;

a path selecting unit (i) comparing the determined predetermined threshold value with a received signal strength indicator of a first packet sent by the direct communication from the second wireless communication apparatus to the first wireless communication apparatus, and (ii) determining a communication path for a second packet to be sent to the second wireless communication apparatus by the direct communication or through the relay apparatus, and wherein the stored predetermined threshold values are set based on (i) a maximum physical rate of transmission of the relay apparatus and (ii) an effective rate of transmission between the first wireless communication apparatus and the second wireless communication apparatus via the relay apparatus.

* * * * *